United States Patent [19]

Good

[11] Patent Number: 4,646,410

[45] Date of Patent: Mar. 3, 1987

[54] ANCHOR REMOVING ASSEMBLY

[76] Inventor: Leland F. Good, 100 NE. 6 Ave., Lot 11 De Soto Park, Homestead, Fla. 33030

[21] Appl. No.: 872,631

[22] Filed: Jun. 9, 1986

Related U.S. Application Data

[63] Continuation-in-part of Ser. No. 695,673, Jan. 28, 1985, abandoned.

[51] Int. Cl.[4] .......... B23P 19/04

[52] U.S. Cl. .......... 29/252

[58] Field of Search .......... 29/252, 263, 264; 254/29 A

[56] References Cited

U.S. PATENT DOCUMENTS

| | | | |
|---|---|---|---|
| 2,234,824 | 3/1941 | Kingston | 29/263 |
| 2,596,549 | 5/1952 | Hamilton | 29/263 |
| 2,866,370 | 12/1958 | Biach | 29/252 X |
| 3,200,484 | 8/1965 | Garman | 29/263 |
| 3,703,030 | 11/1972 | Simms | 29/252 |
| 4,485,677 | 12/1984 | Amelot et al. | 254/29 A X |

*Primary Examiner*—Frederick R. Schmidt
*Assistant Examiner*—Steven P. Schad
*Attorney, Agent, or Firm*—John C. Malloy

[57] ABSTRACT

A pulling adaptor assembly specifically structured to be readily assembled and disassembled and thereby presented in a kit-type construction adaptable to any of a plurality of conventional pulling mechanisms such as hydraulic ram wherein the subject assembly is intended to remove either a male or female anchor element from a concrete or like material base, slab, wall, etc. The components of the subject pulling adaptor assembly are cooperatively structured and disposed relative to one another to maintain and increase a distance between the pulling mechanism and the anchoring slab, wall or structure such that sufficient resistance can be presented to the pull shaft of the hydraulic ram or pulling mechanism in order to concentrate the exerted pulling force on the embedded anchor.

9 Claims, 10 Drawing Figures

ANCHOR REMOVING ASSEMBLY

BACKGROUND OF THE INVENTION

This is a continuation-in-part of Ser. No. 695,673, filed Jan. 25, 1985, now abandoned. 1. Field of the Invention:

A pulling adaptor assembly of the type designed to be used in combination with a conventional hydraulic or similarly powered pulling mechanism wherein the adaptor assembly comprises a plurality of components cooperatively disposed and structured to accomplish ready assembly and disassembly and thereby be presented and utilized in a kit form eliminating the need for the time-consuming and troublesome core drilling in the removal of a firmly affixed anchor element.

2. Description of the Prior Art:

In modern-day construction techniques various utility boxes or housings are mounted on exposed wall surfaces through the provision and placement of a plurality of anchor bolts. Such anchor bolts generally are embedded within the concrete material walls and frequently include an enlarged anchoring structure affixed to or integral with the embedded end of the anchor bolt or like element. However, such bolts are frequently required to be removed and/or eliminated when not utilized. Such anchor elements have been cut off at a location adjacent to the exterior surface of the wall or base in which they are embedded. Alternately, the entire anchor element is removed utilizing a conventional core drilling method known in the prior art for many years. The latter method is extremely time consuming and will require equipment which is not convenient to locate in certain areas of construction sites such as when building modern-day high rise structures. Therefore, there is a need in the construction industry for a simple and efficient mechanism designed for the removal of either a male or a female anchor element. Such a preferred mechanism should be capable of being powered through the use of conventional hydraulic ram cylinders or other powered pulling mechanisms which are readily available at almost all job site locations.

It is well recognized that various pulling devices are known and established in the prior art as represented by the following U.S. Pat. Nos. 2,475,040 to Mandl; Skilling, 2,628,420; Herrstrum, 2,835,128; Keys, 3,791,011; Ciminero, 4,000,556; and Miller, 4,355,450. The majority of these devices are specifically designed to pull or remove tubes or bolts from a supporting base. However, the majority of the structures disclosed in the above set forth patents incorporate large, bulky and generally specialized equipment which is not readily adaptable for field use and placement and operation in hard to reach locations such as during the construction of a multi-level structure.

Accordingly, there is a need in the building industry for a pulling adaptor assembly used in combination with a conventional pulling mechanism such as an hydraulic or similarly powered pulling ram. The various components comprising such an adaptor assembly can be readily assembled and disassembled so as to be carried and/or stored in a kit-type arrangement and thereby add to the versatility and efficiency of the assembly and its use in the field for on the job application.

SUMMARY OF THE INVENTION

The present invention relates to a pulling adaptor assembly primarily designed to be used with any conventional pulling mechanism such as a hydraulic ram, electrically powered pulling device or like structure. Such conventional pulling mechanisms are commonly available at most construction sites and are utilized for a number of varied applications. Accordingly, an important feature of the present invention is its use in combination with any of the aforementioned type pulling mechanisms and further, as explained in greater detail hereinafter, the ready assembly and disassembly of the various components of the pulling adaptor thereby rendering available for use in a kit type format.

The pulling adaptor assembly comprises an adaptor coupling including a first portion structured for removable interconnection between a pull shaft of the pulling mechanism and an anchor bolt or like anchored object. Typically, the anchored object is embedded, at east partially, in a concrete or like material slab and is utilized for mounting utility housings or casings on such slab or wall. Interconnection of the adaptor coupling to both the pull shaft of the pulling mechanism and the anchored object causes a fixed interconnection therebetween and a pulling force to be exerted on the anchored object once the pulling mechanism is activated and the pull shaft is forced into a pulling motion against the anchored object.

The pulling adaptor assembly further comprises a resistance sleeve having a hollow configuration and disposed in surrounding, substantially concentric relation about the first portion of the adaptor coupling. The length of the resistance sleeve is greater than the first portion of the adaptor coupling so as to allow travel of the coupling within the sleeve a distance equal to the stroke of the pull shaft.

A backing plate has a substantantially planar configuration and includes an integrally formed central aperture disposed in surrounding relation to the pull shaft and in generally abutting relation to the pull mechanism such that the pull shaft moves reative to the backing plate. The backing plate is located adjacent one end of the resistance sleeve associated with the pull mechanism.

A pressure plate is disposed in abutting relation to the opposite end of the resistance sleeve and also in abutting relation to the exposed surface of the wall or slab or like anchoring structure in which the anchor bolt is mounted. A central aperture is provided in the pressure plate which is specifically dimensioned to allow passage therethrough of the anchor bolt as it is pulled from the anchoring structure. However, the dimension of the central aperture in the pressure plate is such as to effectively retain material (wall or slab) surrounding the anchored object within the anchoring structure. Therefore, enlarged "plug" of material will not be removed with the anchor bolt when it is forced from the anchoring structure along its own longitudinal axis.

An important feature of the present invention is the provision of an extension means structured to increase the distance between the pull mechanism and the anchoring structure and maintain firm resistance therebetween as a pull force is exerted on the anchored object. This extension means comprises a plurality of shim elements which may be added, in substantially surrounding relation, to the exterior of the pull shaft of the pulling mechanism after the completion of each stroke when the anchored object is still affixed, at least partially, within the anchoring structure. More specifically, the length of the stroke of the pulling mechanism is such that the anchor bolt will not be removed at the end of a single stroke. After the end of such stroke additional shims must be added to extend and maintain the distance between the pulling mechanism and the anchoring structure so that proper resistance can be provided to the pulling force exerted on the anchor bolt by the pull shaft upon activation of the pulling mechanism. A plurality of such shims are added which collectively define the distance of the stroke, after each stroke is completed. The components of the pulling adaptor assembly, more specifically the backing plate, plurality of shims, resistance sleeve, and pressure plate are collectively sandwiched between the pulling mechanism and the exposed surface of the anchoring structure and provide a rigid resistance against the pulling force exerted on the anchored object by the pull shaft.

Other features of the present invention comprise the adaptor coupling including a second portion in the form of a supplementary coupling element comprising an elongated externally threaded shaft. One end of such shaft is removably but fixedly connected to the first portion of the adaptor coupling and the opposite end is structured for removable but fixed attachment to a female anchored object such as a tube or the like. Interconnection between the pull shaft and the female anchored object is thereby completed due to the interconnection of the first portion and second portion of the adaptor coupling with one another and with the pull shaft and female anchored object respectively at opposite ends thereof.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 5 is an end view taken along line 5—5 of FIG. 4 showing details of the pressure plate of the present invention.

FIG. 6 is an end view taken along line 6—6 of FIG. 4 showing details of the backing plate of the present invention.

FIG. 7 is an end view along line 7—7 of FIG. 4 showing details of a shim element of the present invention.

FIG. 8 is a front elevational view of a first portion of the adaptor coupling of the present invention.

FIG. 9 is an isometric view of an auxiliary tool used after removal of the anchored object from an anchoring structure.

FIG. 10 is an isometric view of a resistant sleeve of the present invention.

Like reference characters refer to like parts throughout the several views of the drawings.

DETAILED DESCRIPTION OF THE PREFERRED EMBODIMENT

Figure 1:
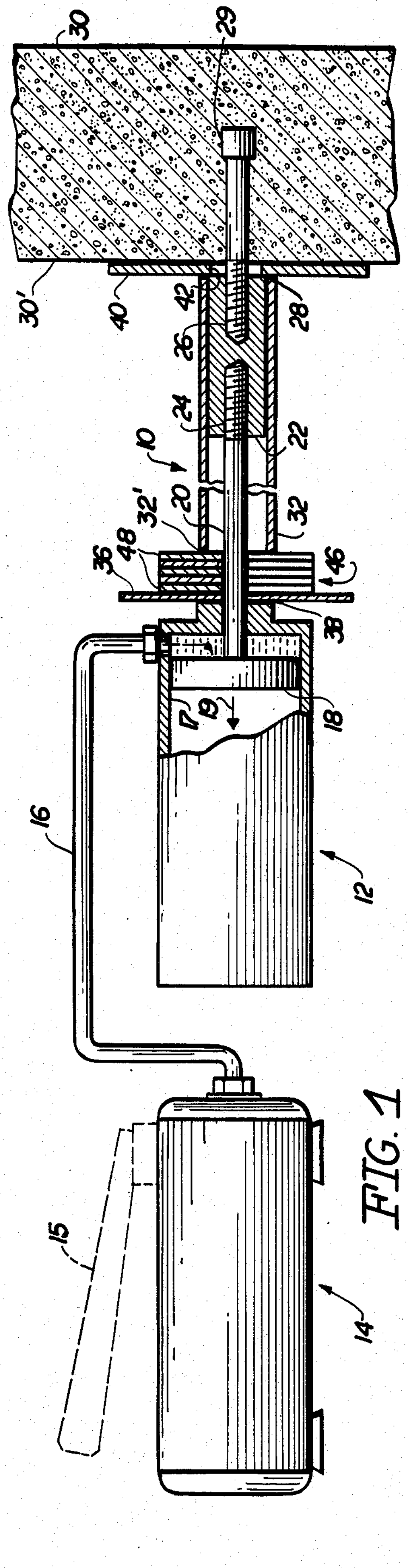
FIG. 1 is a side elevation in partial cutaway and section showing the components of the subject pulling adaptor assembly, their interrelation to one another and the operation and placement of a pulling mechanism relative thereto.

As shown in FIGS. 1 through 4, the pulling adaptor assembly of the present invention is generally indicated as 10 and is primarily designed to be used in combination with a pulling mechanism such as a hydraulic ram 12 fluid activated by pump means 14. It is to be emphasized that other pulling mechanisms such as an electrically powered pulling ram or like device can be utilized instead of the hydraulic ram 12. However, when such an hydraulic ram is utilized, pump means 14 may be operated by a foot pedal 15 represented in broken lines which forces fluid through conduit 16 into cylinder 17 so as to drive piston head 18 rearwardly within cylinder 17 in accordance with directional arrow 19. Rearward travel of the piston head 18 results in similar travel of pull shaft 20 and a pulling force being exerted on any object to which the pulling shaft 20 is attached. It should be noted that the specific dimensions and relative positions or displacements of piston head 18, pull shaft 20 and other components of the subject pulling assembly are not proportionally dimensioned but are provided in certain displaced position for purpose of explanation only.

Figure 2:
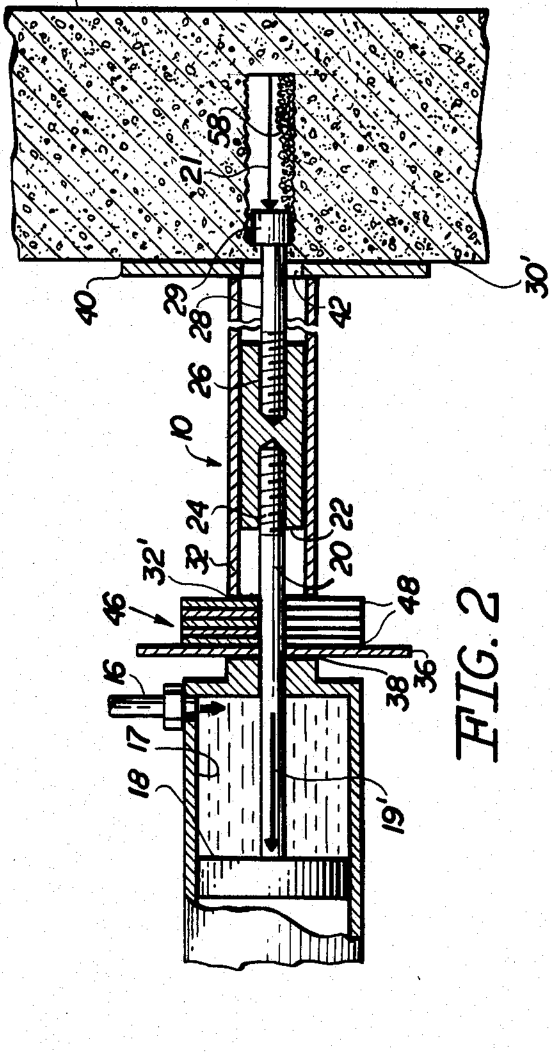
FIG. 2 is a sectional view in partial cutaway showing structural details and relative disposition of the components of the invention after a first stroke of the pulling mechanism has been activated.
Figure 4:
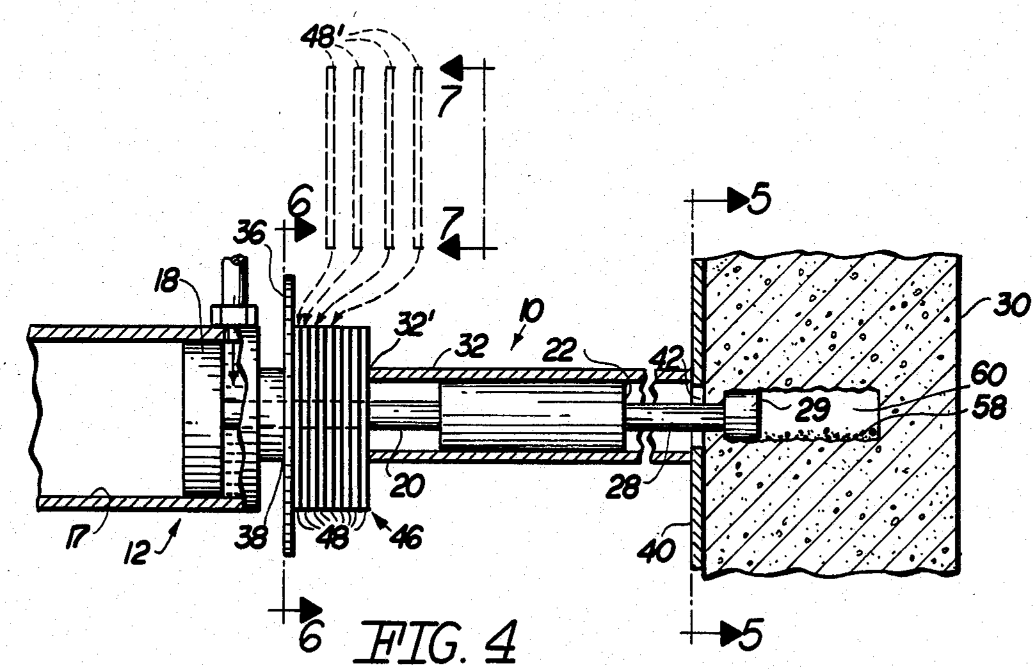
FIG. 4 is a side elevational view in partial cutaway and section showing the addition of a plurality of shim elements during operation of the subject pulling adaptor assembly.

The pulling adaptor assembly of the present invention comprises an adaptor coupling including a first portion 22 having a first threaded bore 24 formed in one end thereof which is dimensioned and positioned for removable but fixed connection to an appropriately structured end of pulling shaft 20. The first portion 22 has its opposite end structured to include a second internally threaded bore 26 for fixed but removable connection to a anchored object 28 fixedly mounted within an achoring structure such as a wall, slab, etc. formed of cementitious or like rigid and binding material. In the embodiments of FIGS. 1, 2 and 4, the anchored object 28 is defined by an anchor bolt having a male configuration such that the second threaded bore 26 of the first portion 22 of the adaptor coupling may be fixedly attached thereto. It is important to note that the first portion 22 has its first bore 24 specifically dimensioned for connection to the pull shaft 20 and the second bore 26 specifically dimensioned for attachment to the anchored bolt 28. Obviously, various first portions 22 can be used and/or replaced dependent upon the relative sizes of the pull shaft 20 and/or the anchored bolt 28.

Figure 3:
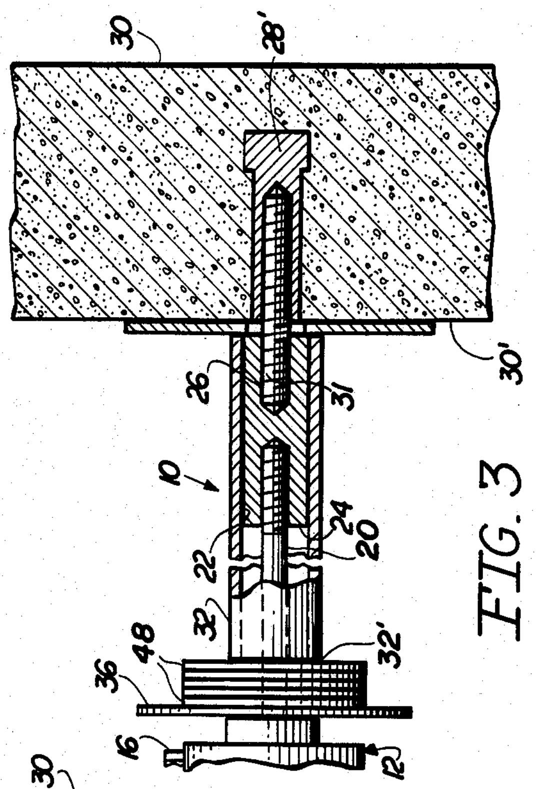
FIG. 3 is a sectional view of another embodiment of the present invention wherein an adaptor coupling includes a first portion and a second portion the latter being structured for engagement with a female anchored object.

With reference to the embodiment of FIG. 3, the adaptor coupling further comprises a supplementary coupling element 31 which has one end fixedly attached within second bore 26 but removable therefrom. The opposite end of the coupling element 31 is structured to engage the interior socket or threaded portion of a female anchored object 28' which also may be embedded within a slab or wall 30 as shown. Therefore, a comparison between FIGS. 1 and 3 shows that when the anchored object has a male configuration such as anchor bolt 28, the first portion 22 only may be utilized. However, when the anchored object has a female configuration as in 28' a supplementary coupling element 31 comprises a second portion of the adaptor coupling and must be used in combination with the first portion 22 as shown.

Other structural features of the subject pulling adaptor assembly 10 comprise a resistance sleeve 32 having an elongated configuration and a hollow interior portion for disposition in substantially surrounding relation to the first portion 22 of the adaptor coupling. The length of the resistance sleeve 32 is such as to be sufficiently longer than the length of the first portion 22 so as to allow its travel within the resistance sleeve 32 necessary to remove object 28 from wall 30 a distance sufficient to accommodate the length of the stroke or strokes of the pulling mechanism 12 necessary to remove object 28 from wall 30. The relative longitudinal dimensions of first potion 22 and resistance sleeve 32 will be explained in greater detail hereinafter with reference to FIGS. 2 and 4.

A backing plate 36 comprises a central aperture 37 (FIG. 6) so as to allow surrounding, concentric relation of the backing plate 36 about the pull shaft 20. Further, one surface of the backing plate 36 is disposed in resisting and/or abutting relation to the pulling mechanism 12 as at 38. As seen in FIGS. 1 through 4, the backing plate 36 is located adjacent one end of the resistance sleeve 32. The opposite end of resistance sleeve 32 is disposed in abutting relation with a pressure plate 40. Such pressure plate (see FIG. 5) has a substantially planar configurtion and a central aperture 42 which surrounds the anchored object 28. More specifically, the central aperture 42 is dimensioned to allow passage of the anchored object 28 therethrough when a pullin9 force is exerted thereon. Similarly, the enlarged head or an anchoring portion 29 also passes through the enlarged central aperture 42. However, the dimension of central aperture 42 and its abutting relation against an exposed surface 30' of the anchoring structure 30 prevents any large "plug" or chunk of material to be removed from the anchoring structure 30 such as when the enlarged portion 29 passes from the slab or anchoring structure 30.

An important feature of the present invention is the provision of extension means generally indicated as 46. Such extension means 46 includes a plurality of shim elements 48 (see FIGS. 4 and 7) which are positionable in sandwiched relation between one end as at 32' of the resistance sleeve 32 and the backing plate 36. Each of the shims 48 includes an open ended mounting channel 50 extnding from an open peripheral portion 51 to a curvilinear end 52 radially disposed outward from an approximate center of the shims 48 and 48. The open ended mounting channel 50 is provided so that the individual shims 48 and 48' can be mounted on the exterior of the pull shaft 20 in a straddle-like position without disconnection of the components of the pulling adaptor assembly.

The structure of the present invention as shown in FIG. 4 will be described herein in detail with further reference to FIGS. 1 and 2. More specifically, FIG. 1 shows the pulling adaptor 10 of the present invention in the position prior to the first stroke or pull being exerted on the object 28. It should be noted in FIG. 1 that the shims 48 of the extension means 46 are positioned between one end 32' of the resistance sleeve 32 and the backing plate 36 in order to insure that there is a rigid resistance between the pull mechnism 12 and more specifically the pull shaft 20 and the sleeve 32 or the end of the sleeve 32' resting on shims 48. With reference to FIG. 2, the position of the pulling mechanism of the present invention is therein represented after a first pull or stroke of the pulling mechanism 12 and piston 18 has been accomplished. It should be noted in FIG. 2 that after the first pull, the object 28 and specifically the head 29 is not completely removed from the wall or anchoring structure 30. This is due to the fact that the length of the pull or distance traveled by the object 28 and head 29 as it begins to move out of wall 30 is determined by the length of the stroke of piston 18 within cylinder 17. More specifically, the distance of travel of piston 18, indicated by arrow 19' is equal to the distance of travel of the object 28 and head 29 indicated by arrow 21. However, frequently it is the case that the length of the stroke or travel of piston 18 and accordingly object 28 is not sufficient to completely remove the head 29 from the wall 30 with the first pull. Therefore, at least a second pull (or subsequently additional pulls) need be exerted on the object 28 in order to remove it completely from wall 30. The second pull is accomplished by returning the piston 18 from its extended position (FIG. 2) to its original retracted position as shown in FIGS. 1 and 4. With reference to FIG. 4, the retracted, "ready" position is accomplished by removing at least a majority of the hydraulic fluid from the cylinder 17 and them moving the cylinder axially along the direction of pull and away from the resistance sleeve 32. This in turn results in a "gap" created between the existing shims 48 and the backing plate 36. The additional shims 48', represented in FIG. 4 in solid lines, when properly positioned, fill the gap resulting from the axial displacement or repositioning of the pulling mechanism 12 away from the resistance sleeve 32. The pull mechanism is then ready to be actuated to accomplish a second stroke or pull in the same manner of operation as when the first stroke was accomplished as explained with reference to FIG. 1. The addition of shims 48' in combination with originally positioned shims 48 offer the necessary resistance between the pull mechanism and the end of sleeve 32' resting on the collective shims 48 and 48' (FIG. 4). It is also important to note that the number of shims 48' is dependent upon the size of the "gap" or the distance of repositioning or displacement of the pulling mechanism 12 from the resistance sleeve 32.

It should also be emphasized that the length of the resistance sleeve 32 must be sufficient to accommodate travel or positioning of the first portion of the coupling 22 within the interior of the resistance sleeve 32 during the first or subsequent second or additional strokes necessary to remove the object 28 from the wall 30.

With reference to FIG. 9, the present invention further comprises the inclusion of an auxiliary tool generally indicate as 56 which may remove the debris 58 from the hole 60 formed once the anchored object 28 is removed. Such tool 56 includes a scraper type head 57 positionable within the formed hole 60 and a handle 59 for manipulation of the tool 56.

It is therefore to be understood that the following claims are intended to cover all of the generic and specific features of the invention herein described, and all statements of the scope of the invention which as a matter of language might be said to fall therebetween.

Now that the invention has been described, what is claimed is:

1. A pulling adaptor assembly primarily designed for use in combination with a pulling mechanism for removal of an object from an anchored position in an anchoring structure, said assembly comprising:

(a) an adaptor coupling structured for removable interconnection between a pull shaft of the pulling mechanism and the anchored object and movable therewith, (b) a resistance sleeve having a hollow interior along the length thereof and removably mounted in surrounding relation to said adaptor coupling, said resistance sleeve having a longitudinal dimension greater than said adaptor coupling and defining at least a minimum distance between the pull mechanism and an anchoring structure, (c) a backing plate removbaly mounted in abutting engagement with the pulling mechanism and fixedly disposed in interconnected and resisting relation to said resistance sleeve substantially adjacent one end thereof, (d) extension means comprising a plurality of shim elements collectively and removably mounted between said one end of said resistance sleeve and said backing plate, said plurality of shims collectively defining the distance between said one end of said resistance sleeve and said backing plate, (e) said distance being increased upon additional ones of said plurality of shims being added between said backing plate and said one end of said resistance sleeve prior to each subsequent stroke of the pulling mechanism after a first stroke of the pulling mechanism, (f) said adaptor coupling and anchored object movable within said hollow interior of said resistance sleeve away from the anchored position of the anchored object, during each stroke of the pulling mechanism, and (g) whereby the distance between the pulling mechanism and said resistance tube is increased by the addition of a number of shims added to said plurality of shims between said backing plate and said one end after each stroke of the pulling mechanism until the object is removed.

2. An assembly as in claim 1 further comprising a pressure plate disposed in force, abutting engagement with and between an exposed surface of the anchoring structure and a correspondingly positioned end of said resistance sleeve, said pressure plate including a central aperture formed therein in surrounding relation to a central longitudinal axis of the anchored object and said central aperture dimensioned to allow passage therethrough of the anchored object and retention of the anchoring portion of the anchoring structure.

3. An assembly as in claim 2 wherein said backing plate is disposed in surrounding relation to the pull shaft of the pulling mechanism and in firm, abutting engagement between said plurality of shim elements and the pulling mechanism, said backing plate and said pressure plate removably mounted in transverse relation to said pulling path adjacent opposite ends of said resistance sleeve.

4. An assembly as in claim 1 wherein said adaptor coupling includes a first portion comprising a one-piece construction including a first internally threaded bore at one end thereof dimensioned for removable connection to the pull shaft, and a second internally threaded bore at the other end thereof, said second bore dimensioned for attachment to a male anchored object.

5. An assembly as in claim 4 wherein said first and said second bore are of different dimensions and said adaptor coupling being movable on the interior of said resistance sleeve in a direction coaxial to said resistance sleeve, pull shaft and anchored object upon activation of the pulling mechanism.

6. An assembly as in claim 1 wherein said adaptor coupling further comprises a first portion comprising a one-piece construction including a first internally threaded bore at one end thereof dimensioned for removable connection to the pull shaft, and a second internally theaded bore at the other end thereof, and a second portion including a supplementary coupling element comprising an elongated shaft removably attached at the other one end of said first portion and structured for removable connection at the opposite end to a female anchored object, said second portion and said first portion attached in colinear relation to one another and to the anchored object.

7. An assembly as in claim 6 wherein said resistance sleeve is of sufficient longitudinal dimension to substantially surround said first and said second portions of said adaptor coupling and the pull shaft, said latter elements all movable relative to said resistance sleeve, said resistance sleeve cooperatively disposed along with said plurality of shim elements so as to maintain a predetermined distance dependent upon the number of shim elements between the pulling mechanism and the anchoring structure.

8. An assembly as in claim 1 wherein each of said plurality of shim elements comprises a substantially flat, planar configuration having a mounting channel integrally formed therein and extending from substantially the center thereof outwardly through a periphery thereof, said mounting channel defining an open ended configuration serving to open a periphery of said shim element, each of said shim elements removably mounted on the pull shaft of the pulling mechanism about the exterior of the pull shaft.

9. An assembly as in claim 8 wherein said plurality of shim elements are positioned in sandwiched, abutting relation between an end of said resistance sleeve and said backing plate, the number of shim elements dependent upon an amount of extension desired of said pulling path and an amount of desired distance to be established between the anchoring structure and the pulling mechanism.

* * * * *